United States Patent [19]
Josephs

[11] Patent Number: 5,425,091
[45] Date of Patent: Jun. 13, 1995

[54] METHOD AND SYSTEM FOR PROVIDING AN AUTOMATIC CUSTOMER CALLBACK SERVICE

[75] Inventor: Hugh S. Josephs, Boulder, Colo.

[73] Assignee: U S WEST Technologies, Inc., Boulder, Colo.

[21] Appl. No.: 202,312

[22] Filed: Feb. 28, 1994

[51] Int. Cl.[6] ............................................. H04M 3/48
[52] U.S. Cl. .................... 379/201; 379/202; 379/206; 379/209; 379/67
[58] Field of Search ............... 379/201, 206, 207, 209, 379/67

[56] References Cited

U.S. PATENT DOCUMENTS 4,878,240  10/1989  Lin et al. ................................ 379/67
5,311,583  5/1994  Friedes et al. ........................ 379/207

Primary Examiner—James L. Dwyer
Assistant Examiner—Scott Wolinsky
Attorney, Agent, or Firm—Timothy R. Schulte; Stephen F. Jewett

[57] ABSTRACT

Automatic Customer Callback (ACC) functionality is implemented directly into service logic of an Advanced Intelligent Network (AIN). The Advanced Intelligent Network includes a Central Office Switch (COS) which is provided in electrical communication with Service Control Point (SCP), at least one calling party, and at least one called party. The AIN components preferably communicate with one another through Transaction Capability Application Part (TCAP) signaling protocol and are directed for use in an AIN 0.2 network. An adjunct processor such as an Intelligent Peripheral (IP) is also provided in electrical communication with the COS. In operation, digits dialed by the calling party (those corresponding to the telephone number of the called party) are collected as well as the calling party telephone number. If the called party line is busy, then the calling party activates the Automatic Customer Callback (ACC) service, the subscriber's telephone line will be monitored to detect an idle condition. Once this condition is detected, a call may be originated from the adjunct processor to the subscriber whereupon a message may be played for receipt by the subscriber advising the same of the need to call back the calling party who has activated the ACC service. In an alternative embodiment, a three-way call is automatically originated from the adjunct processor to the subscriber and the calling party where, following completion of the call, the adjunct processor will disconnect itself.

13 Claims, 3 Drawing Sheets

METHOD AND SYSTEM FOR PROVIDING AN AUTOMATIC CUSTOMER CALLBACK SERVICE

TECHNICAL FIELD

The present invention relates generally to Advanced Intelligent Network (AIN) services and, more particularly, to a method and system for providing an Automatic Customer Callback (ACC) service.

BACKGROUND ART

There are currently in existence a number of call management features which are switch-based and must be accessed by subscribers off-hook through entry of appropriate activation codes. Such services include, for example, some of the Custom Local Access Signaling Services referred to by the acronym CLASS SM. For example, Automatic Callback (AC) is a CLASS outgoing call management feature which enables a customer encountering a busy station to perform an activation procedure and have call set-up performed automatically when the called station becomes idle. This feature has heretofore been directed to customers who need to reach a party that is currently busy and provides the customer with an alternative to automatic redialers and manual, repetitive call attempts. By eliminating trunk, line and equipment seizures until both parties are found idle, the CLASS Automatic Callback feature has been found to have a positive effect on network resources usage.

The CLASS Automatic Recall (AR) feature has been found to have a similar positive effect and operates in much the same way as CLASS AC. The main difference, however, is that the AR feature attempts to call a directory number associated with the most recent incoming call received by the customer as opposed to the most recent outgoing call.

Regardless of whether CLASS AC or CLASS AR are selected, or any other presently available switch-based service, heretofore the method of initiation has been the same. Namely, the user must physically go off-hook and take active steps to request initiation of the desired call management feature through entry of an appropriate access code. In fact, to even have an access code, the calling party must generally be a subscriber to the service sought to be utilized and pay a flat fee rate on a monthly or other periodic basis. As a result, those skilled in the art will recognize that customer usage of these switch-based services have generally met with limited success and, in most cases, have not approached capacity levels.

Consequently, a need has developed to provide a method and system for providing call management features which may be invoked by a calling party, typically a consumer, without going off-hook. More particularly, a need has developed for a method and system which provide an Automatic Customer Callback (ACC) service which may be implemented directly in the service logic of an Advanced Intelligent Network and which may be activated by consumers on a large scale basis. Such a method and system should require only that the called party be an ACC service subscriber and should be easy to activate by consumers through limited instructions.

DISCLOSURE OF THE INVENTION

It is a general object of the present invention to overcome the limitations of the prior art by providing a method and system for providing an Automatic Customer Callback (ACC) service which may be implemented directly in the service logic of an Advanced Intelligent Network (AIN).

It is a further object of the present invention to provide a call management feature which may be implemented directly in the service logic of an Advanced Intelligent Network (AIN) and which may be activated by calling parties without going off-hook and entering an access code.

Yet another object of the present invention is the provision of a method and system for providing an Automatic Customer Callback service in an Advanced Intelligent Network which may be activated by numerous calling parties and which requires only that the called party be an ACC service subscriber.

In carrying out the above-disclosed objects and other objects, features, and advantages of the present invention, the method disclosed herein is specifically directed for use in an Advanced Intelligent Network (AIN) having a Central Office Switch (COS) provided in electrical communication with a Service Control Point (SCP), at least one calling party, and at least one called party. These AIN components preferably communicate with one another through Transaction Capability Application Part (TCAP) signaling protocol and are directed for use in an AIN 0.2 network. Other signaling protocols in network versions, however, may be utilized depending upon the desired application.

In keeping with the invention, the method disclosed includes providing an adjunct processor such as, for example, an Intelligent Peripheral (IP), in electrical communication with the Central Office Switch (COS). The invention further comprises automatically collecting digits dialed by the calling party which correspond to the telephone number of the called party as well as collection of the calling party telephone number. By monitoring communications, preferably TCAP signaling (between the central office switch, the calling party and the called party), predetermined triggers and line conditions may be detected. Following their detection, normal call handling is suspended and a corresponding first electrical signal is generated for receipt by the SCP requesting further call processing instructions.

If the called party line is busy, then the collected digits, i.e. the telephone number of the called party, is analyzed to determine if the called party is an ACC service subscriber. A corresponding second electrical signal will thus be generated for receipt by the central office switch responsive to this analysis. If the ACC service is activated by the calling party, a third electrical signal may thereafter be generated for receipt by the adjunct processor corresponding to the collected digits, i.e. the subscriber's telephone number as well as the calling party's telephone number. The subscriber's telephone line may thereafter be monitored to detect an idle condition.

In keeping with the invention, this monitoring may be performed by either the adjunct processor or the central office switch, as Well as any other suitable monitoring means. Once an idle condition is detected, a call may be originated from the adjunct processor to the subscriber whereupon a message may be played for receipt by the subscriber advising the same of the need to call back the calling party who has activated the ACC service.

In an alternative embodiment disclosed herein, following detection of an idle condition, a three-way call may be originated from the adjunct processor to the subscriber and the calling party where, following completion of the call, the adjunct processor will automatically disconnect itself.

Like the above disclosed method, the system of the present invention is similarly adapted for use in an Advanced Intelligent Network (AIN) and, preferably, Release 0.2 which is adapted to detect the AIN T-busy trigger. The system is operative to provide an automatic customer callback service for a subscribing called party to call back a calling party and comprises at least one end office which is provided in electrical communication with the calling party. The end office is designed to collect dialed digits, i.e. the called party's telephone number as well as the calling party telephone number so as to originate a telephone call.

The system further comprises a Service Control Point (SCP) which is operative to analyze the collected digits and detect called parties who are Automatic Customer Callback (ACC) service subscribers.

The system further comprises a Central Office Switch (COS) which is provided in electrical communication with the calling party, the called party and the SCP, preferably via Transaction Capability Application Part (TCAP) signaling protocol. In operation, the central office switch is adapted to suspend normal call handling upon detection of predetermined triggers and line conditions such as the above-referenced AIN T-busy trigger and to request further call processing instructions from the SCP as well as the calling party.

The system further comprises adjunct processing means for receiving and storing collected digits in the form of both the subscriber's telephone number as well as the calling party's activation instructions and to coordinate the callback of the calling party by the subscriber. The adjunct processing means is provided in electrical communication with the central office switch and may comprise, for example, an Intelligent Peripheral (IP). Either the adjunct processing means or the Central Office Switch (COS) of the present invention may be adapted to monitor the status of the subscriber's telephone line in order to detect an idle condition. Once an idle condition has been detected, the adjunct processing means may be further adapted to originate a call to the subscribing party and play a corresponding announcement indicating the need to call back the calling party.

In an alternative embodiment, the adjunct processing means may be further adapted to initiate a three-way call to the subscriber and the calling party upon detection of the idle condition and to automatically disconnect itself from the call once completed.

As further disclosed herein, in yet another alternative embodiment, the central office switch may be further adapted to provide a specialized dial tone, distinct from the stutter dial tone used for voice message notification, to the subscriber indicating the need to call the adjunct processing means to obtain information about the calling party who has activated the Automatic Customer Callback (ACC) service.

The above objects and other objects, features, and advantages of the present invention are readily apparent from the following detailed description of the best modes for carrying out the invention when taken in connection with the accompanying drawings wherein like reference numerals correspond to like components.

BEST MODES FOR CARRYING OUT THE INVENTION

Figure 1:
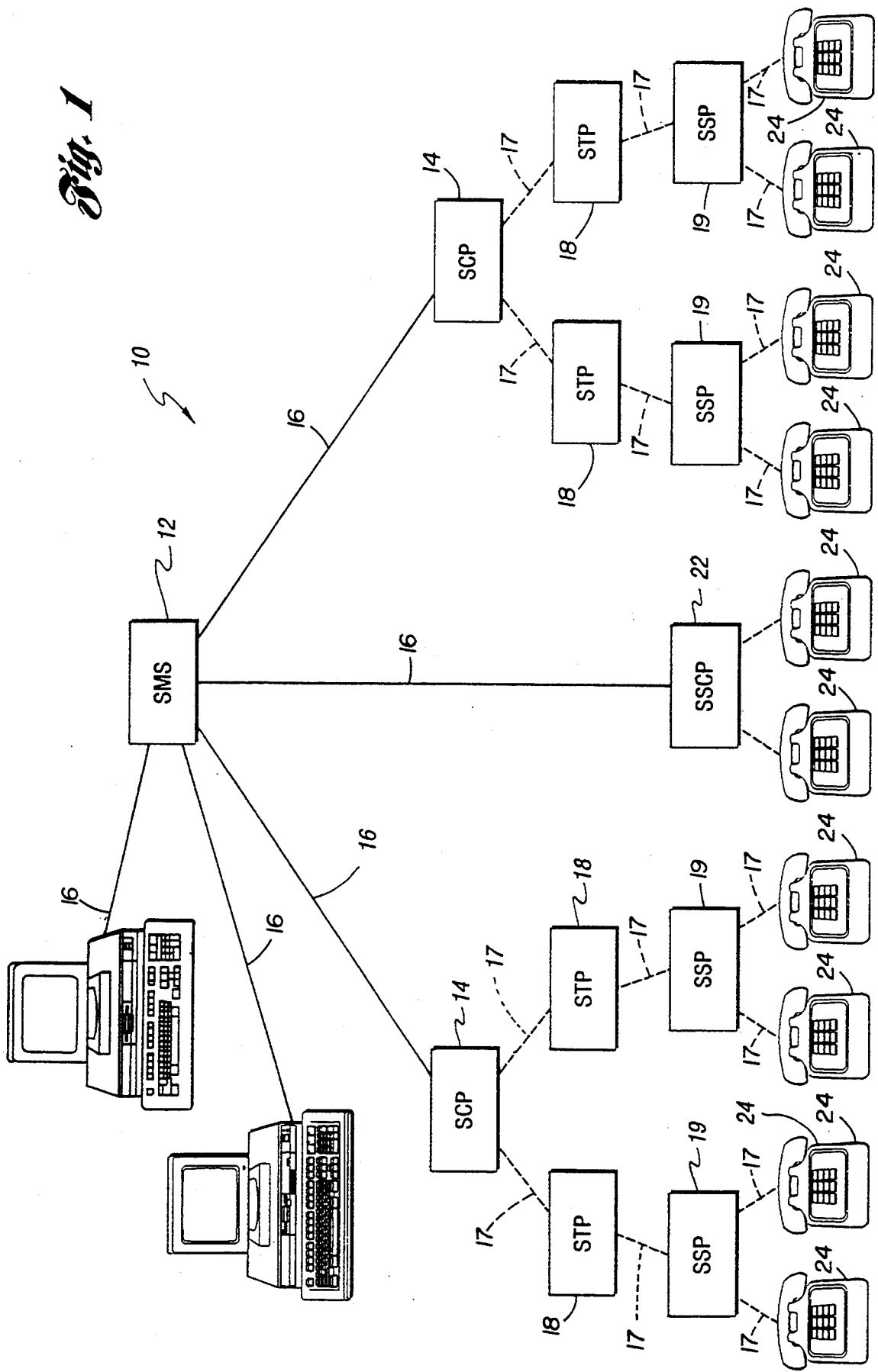
FIG. 1 is a schematic representation of an Advanced Intelligent Network (AIN)

With reference to FIG. 1 of the drawings, a representative diagram of Advanced Intelligent Network (AIN) architecture is disclosed for use in a Public Switched Telephone Network (PSTN). The AIN architecture referred to is designated generally by reference numeral 10. As those skilled in the art will recognize, network architecture 10 is implemented with common channel Signaling System No. 7 (SS7) protocol. Designed to be used primarily in high-speed digital networks, common channel Signaling System No. 7 is capable of controlling low-speed analog facilities as well. SS7 generally operates at 64 kbPS and can support variable message links up to 2,176 bits (272 octets) of information per message.

As those skilled in the art will recognize, the SS7 network is comprised of various packet switching elements and transmission links, some of which are shown in network architecture 10. As shown in FIG. 1, there is provided Service Management System (SMS) 12 which generally comprises a computer-based system used to design service logic, to control logic implementation to the network, and to manage the network operation, such as monitoring traffic levels and collecting statistics and billing data. SMS 12 is provided in electrical communication with a plurality of Service Control Point (SCP) adjuncts 14 via management links 16. As those skilled in the art will recognize, AIN service control points 14 are nodes which contain the service logic and associated data support to execute the required customer services.

Still further, there is provided Signal Transfer Points (STP) 18 in electrical communication with SCP/adjunct 14 via signaling links 17. Service Transfer Points 18 are packet switches used to route signaling messages within the network. Service Switching Points (SSP) 19 are also provided. Again, as those skilled in the art will recognize, Service Switching Points 19 are generally nodes (usually the subscriber's local switch/central office switch) that recognize the "triggers" used when a subscriber invokes an intelligent network service and then communicates with the SCP to operate the service. As shown in FIG. 1 Service Switching Points 19 are provided in electrical communication with Signal Transfer Points 18 via signaling links 17. In limited traffic situations, Service Switching and Control Points (SSCP) 22 are also provided for combining the functions of the SCP and SSP.

Finally, each customer is provided with at least one Customer Premises Equipment (CPE) device 24 such as a telephone, facsimile machine, voice messaging peripheral, modem, or the like. As shown in FIG. 1, CPE devices 24 are provided in electrical communication with Service Switching Points 19 via signaling links 17.

The AIN architecture referenced above is known to those skilled in the art to permit services to be extended through the network. In operation, new services such as that disclosed herein are typically installed on two SCP processing platforms for directly servicing a selected market. In operation, this service management system extends management and control to the remote service control points/adjuncts via a signaling network.

Figure 2:
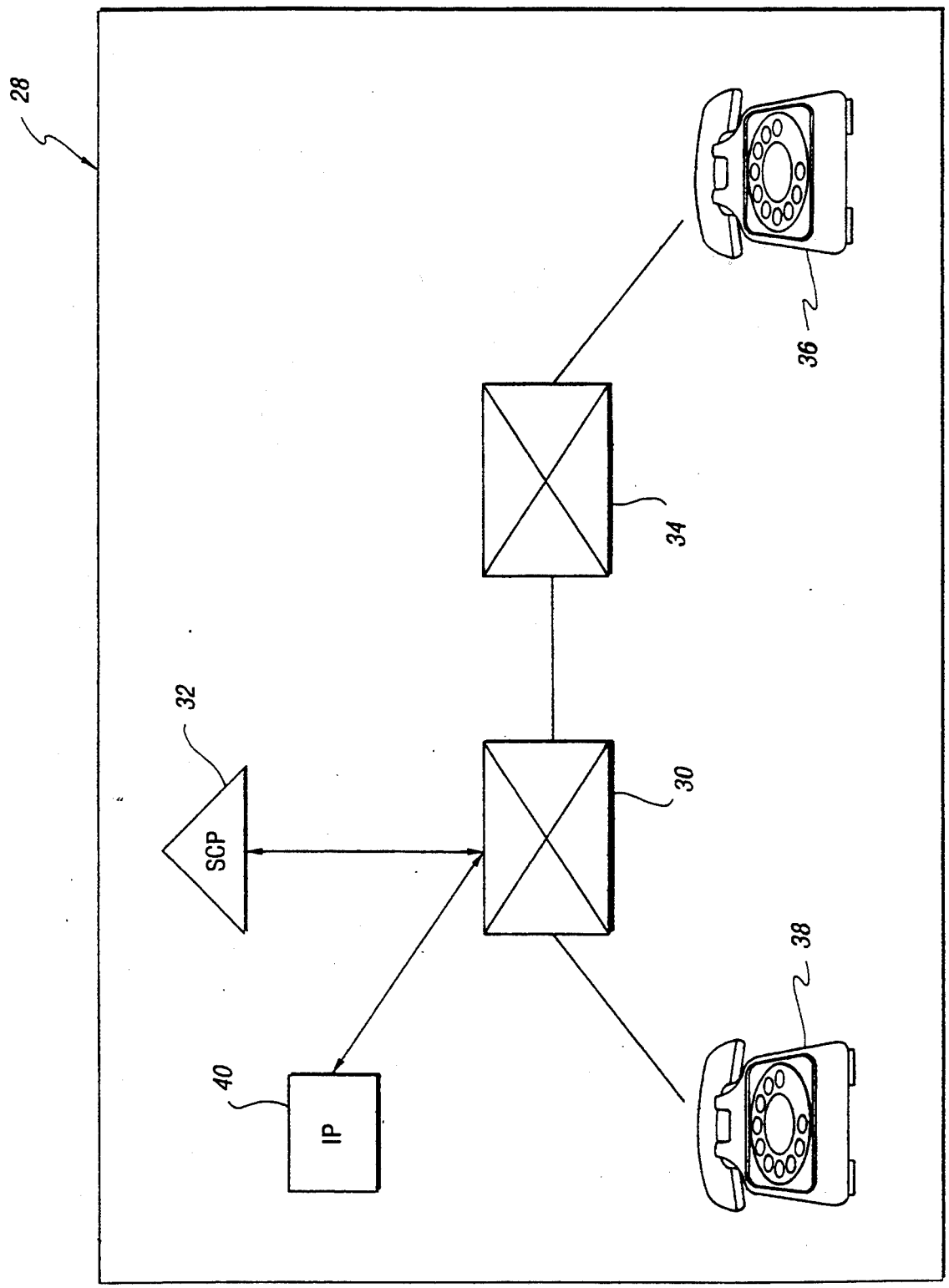
FIG. 2 is a schematic representation of the system of the present invention.

With reference now to FIG. 2 of the drawings, a simplified schematic block diagram of the system of the present invention is provided and designated generally by reference numeral 28. System 28 is provided for use in an Advanced Intelligent Network of the type referenced above and, in particular, Release 0.2. The system thus comprises at least one Central Office Switch 30 which is AIN Release 0.2 equipped. As those skilled in the art will recognize, an AIN Release 0.2 Central Office Switch is one which can recognize a call that requires AIN 0.2 processing by an SCP, without making any assumptions about the service being provided. Switches of this type perform this task by temporarily suspending call processing, and assembling and launching a query to the associated SCP. The subsequent SCP reply provides the switch with information on how to continue processing the call. Similarly, triggering is the process of identifying calls which require AIN handling. Upon encountering a trigger, a central office switch suspends normal call handling and moves to the next step. The central office switch of the present invention, which is preferably equipped with AIN 0.2, supports several types of triggers which may be detected at several trigger detection points of the AIN 0.2 architecture known to those skilled in the art.

In keeping with the invention, there is thus provided a service control point 32 which is provided in electrical communication with central office switch 30, preferably through Transaction Capability Application Part (TCAP) signaling protocol. There is further provided at least one end office 34 which, through TCAP signaling protocol, is similarly provided in electrical communication with central office switch 30 and a calling party 36. Those skilled in the art will, of course, recognize that calling party 36 may be provided in direct electrical communication with central office switch 30 as is shown for called party 38. However, for most large scale applications, both the calling and called parties will be provided in communication with one or more end offices such as end office 34 to avoid the need for equipping every end office with AIN architecture and the Service Logic Program (SLP) logic required by the present invention.

In operation, end office 34 is adapted to collect digits dialed by the calling party 36, i.e. the telephone number of the called party, so as to originate a telephone call. Similarly, central office switch 30 is operative to suspend normal call handling upon detection of the above-referenced predetermined triggers and line conditions such as, for example, the T-busy trigger found in AIN Release 0.2 architecture and to request further call processing instructions from SCP 32 as well as the calling party 36. Finally, the system of the present invention includes adjunct processing means such as Intelligent Peripheral (IP) 40 which is operative to receive and store the above-referenced collected digits as well as the calling party telephone number, for example, through reference to the calling Party Identification (CPI) field in the ISDN User Part (ISUP) Initial Address Message (IAM), which is known to those skilled in the art.

In one preferred embodiment, the adjunct processing means is adapted to coordinate the callback of the calling party by the subscriber by monitoring the subscriber's telephone line so as to detect an idle condition. Once detected, a call may be originated from the adjunct processor to the subscriber 38 whereupon a message will be played upon call completion indicating the need to call back the calling party. Of course, applicants recognize that adjunct processing means 40 need not perform the monitoring function of the subscriber's line. Rather, this function may be performed by other suitable equipment such as, for example, the central office switch itself. In the situation where the central office switch has been designated to monitor called party's line 38 for an idle condition, central office switch 30 will, upon such detection, forward a request to the adjunct processing means to (a) originate a call to the subscriber 38, and (b) play a corresponding announcement as above, indicating the need to call back the calling party.

In yet another alternative embodiment, the adjunct processing means 40 may be further adapted to initiate a three-way call to both the subscriber 38 and the calling party 36 once an idle condition has been detected at the subscriber's telephone line. Following completion of the call, it is anticipated that in accordance with the present invention, the adjunct processing means 40 will be further adapted to automatically disconnect itself from the call.

In yet another known alternative embodiment, central office switch 30 may be further adapted to provide a specialized dial tone such as a "power ring" indicating to the subscriber the need to call adjunct processing means 40 to obtain information about a calling party 36 who has activated the automatic customer callback service.

OPERATION

Figure 3:
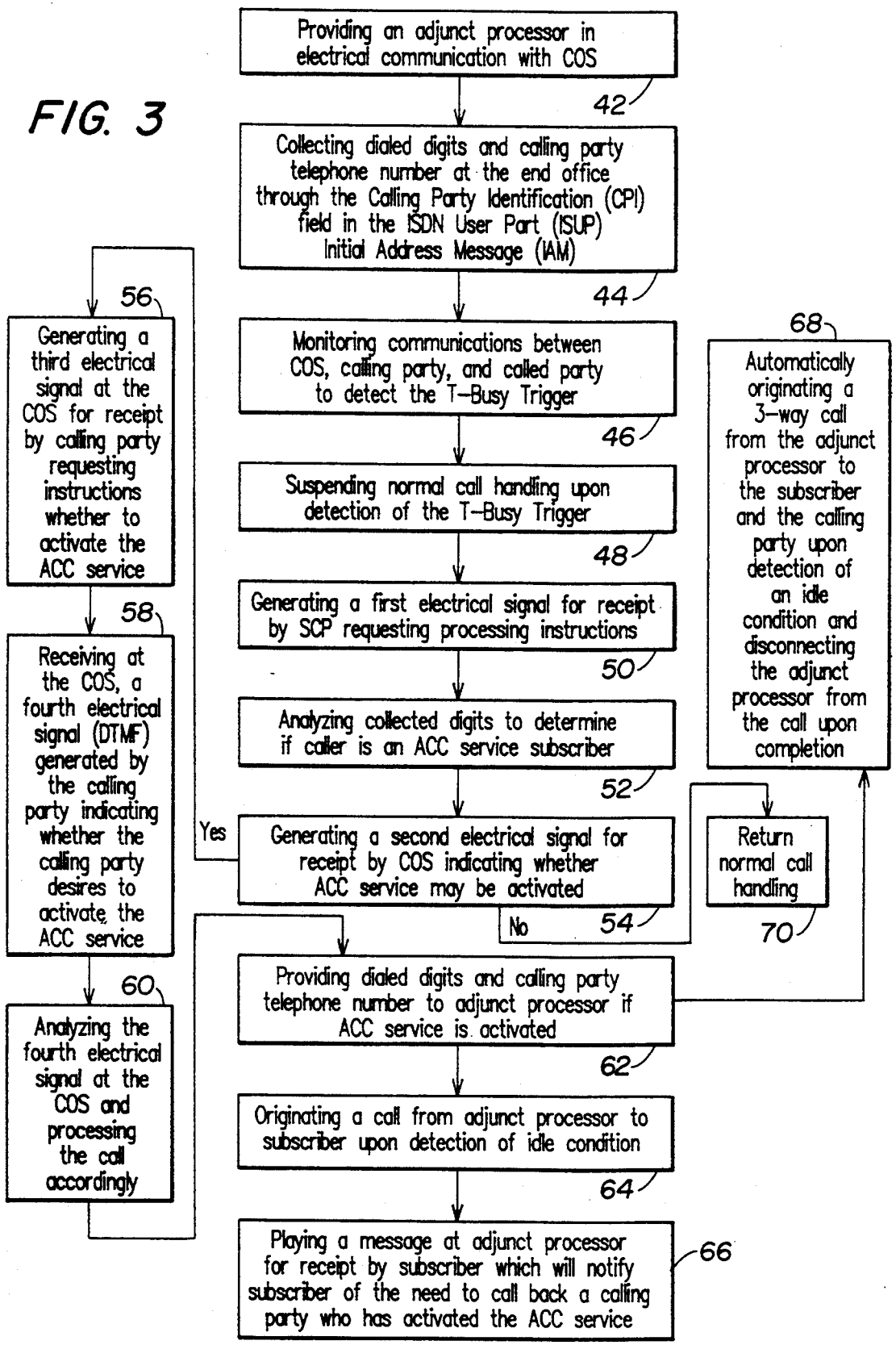
FIG. 3 is a block diagram of the method steps of the present invention.

With reference now to FIG. 3 of the drawings, the specific method of operation of the present invention will be explained in further detail. As referenced above, the method of the present invention is provided for use in an Advanced Intelligent Network having a central office switch which is provided in electrical communication with a service control point, at least one calling party and at least one called party. The method is specifically directed for use in providing an automatic customer callback service and is operative in a preferred embodiment with AIN 0.2 release architecture and is adapted to recognize the T-busy trigger.

The method of the present invention includes, at the threshold, the provision 42 of an adjunct processor such as intelligent peripheral 40 shown in FIG. 2 which is provided in electrical communication with central office switch 30 preferably through TCAP signaling protocol. Upon initiation of a telephone call by a calling party, the dialed digits i.e. the telephone number of the called party, will be collected 44 along with the calling party telephone number. As those skilled in the art will recognize, this information is readily available to the associated end offices 34 and may be communicated to the applicable central office switch 30.

By monitoring 46 communications between the central office switch and the calling party 36, predetermined triggers and line conditions such as, for example, the above-referenced T-busy trigger may be detected. Once detected, normal call handling is suspended 48 whereupon the central office switch 30 generates 50 a first electrical signal for receipt by the SCP 32 requesting further call processing instructions, This first electrical signal, of course, includes the collected digits corresponding to the called party's telephone number which are analyzed 52 within the SCP and compared to a known list of subscribers so as to make a determination of whether the called party is an Automatic Customer Callback (ACC) service subscriber. Once this determination has been made, a second electrical signal may be generated 54 by the SCP for receipt by the central office. Of course, in the case where a determination has been made that the called party is not an ACC service subscriber, normal call handling will be returned 70 almost instantaneously without any indication of the same being provided to the calling party. However, where it is determined by the SCP 32 that the called party is, in fact, an ACC service subscriber, an additional electrical signal will be generated 56 by the central office switch for receipt by the calling party requesting the calling party's instructions regarding the activation of the automatic callback service which has been subscribed to by the called party. The calling party will be prompted for instructions via a recorded announcement.

In cases where the calling party desires to activate the ACC service, a DTMF signal or the like may be generated by the calling party for receipt 58 by the central office switch 30 corresponding to such a decision. A similar DTMF signal may be generated and received in the same manner in the event that the calling party declines to activate the ACC service. For example, if a determination has been made that the called party is an ACC service subscriber, the following message may be provided to the calling party by the central office switch, "We're sorry, but the line you have called is currently busy. If you would like to have your call returned, press 1 and hang up. If you would like to leave a message, press 2, otherwise, please remain on the line for the next available attendant."

Significantly, this message may also be provided as a customized message by a subscribing party and may be stored within the adjunct processing means 40. In such a case, following determination 60 that the called party is an ACC service subscriber, a supplemental electrical signal will be generated by the central office switch 30 for receipt by the adjunct processing means 40 prompting the latter to provide a customized message to the calling party. In keeping with the invention, it is anticipated that such a "customized" message may, at the threshold, identify a called party and may similarly be recorded in a voice which may be recognizable by anticipated callers.

In this embodiment, if a calling party does not elect to have her call returned or leave a message, but rather elects to stay on the line for the next available attendant, following a specified time delay, the central office switch will place the telephone call in queue within the adjunct processing means such that the call may be answered by the next available attendant as promised.

If the ACC service has been activated, the collected digits as well as the calling party telephone number are provided 62 to the adjunct processor. Again, as referenced above, the collected digits are intended to correspond to the telephone number of the called party and should be distinguished from any digits which may have been entered by the calling party and collected by the central office switch during the ACC activation procedure. All of these entered digits are stored in the IAM. Thereafter, the subscriber's telephone line must be monitored either by the adjunct processing means 40, the central office switch 30 or any other suitable component to detect an idle condition. Once detected, various embodiments of the present invention may be implemented. For example, in one embodiment, a call may be originated 64 from the adjunct processor to the subscriber whereupon a message may be played 66 by the adjunct processor 40 to the subscriber advising of the need to call back the calling party who has activated the ACC service. Similarly, in yet another alternative embodiment, a three-way call is automatically originated 68 from the adjunct processor 40 to the called party 38 and the calling party 36 where, following completion of the same, the adjunct processing means 40 is disconnected.

While the best modes for carrying out the invention have been described in detail, those familiar with the art to which this invention relates will recognize various alternative designs and embodiments for practicing the invention as defined by the following claims.

What is claimed is:

1. For use in Advanced Intelligent Network (AIN) having
   (a) a Central Office switch (COS) which is adapted to recognize an AIN T-busy trigger and is further provided in electrical communication with a Service Control Point (SCP) via Transaction Capability Application Part (TCAP) signalling protocol,
   (b) at least one calling party,
   (c) at least one called party, and
   (d) at least one end office provided in electrical communication with said at least one calling party,
   a method for providing an Automatic Customer Callback (ACC) Service, comprising:
   providing an adjunct processor in electrical communication with said COS;
   collecting dialed digits and the calling party telephone number at said at least one end office through a Calling Party Identification (CPI) field in an ISDN User Part (ISUP) Initial Address Message (IAM);
   monitoring said communications between said COS and said at least one calling party and said at least one called party to detect said T-busy trigger;
   suspending normal call handling upon detection of said T-busy trigger and generating a corresponding first electrical signal for receipt by said SCP requesting further call processing instructions;
   analyzing said collected digits to determine if said called party is an ACC service subscriber;
   generating a second electrical signal for receipt by said COS indicating whether said ACC service may be activated;
   providing to said adjunct processor said collected digits and said calling party telephone number if said ACC service is activated;
   monitoring said subscriber telephone line to detect an idle condition;
   originating a call from said adjunct processor to said subscriber upon detection of said idle condition; and
   playing a message at said adjunct processor for receipt by said subscriber, whereupon said subscriber will be advised of the need to call back a calling party who has activated the ACC service.

2. The method of claim 1, further comprising:

generating a third electrical signal at said COS for receipt by said calling party requesting instructions whether to activate said ACC service;

receiving at said COS, a fourth electrical signal generated by said calling party indicating whether said calling party desires to activate said ACC service; and analyzing said fourth electrical signal at said COS and processing said call accordingly.

3. The method of claim 2, wherein said fourth electrical signal is a Dual Tone Multi-Frequency (DTMF) signal.

4. For use in an Advanced Intelligent Network (AIN) including
(a) a Central Office Switch (COS) which is adapted to recognize an AIN T-busy trigger and is further provided in electrical communication with a Service Control Point (SCP) via Transaction Capability Application Part (TCAP) signalling protocol,
(b) at least one calling party,
(c) at least one called party, and
(d) at least one end office provided in electrical communication with said at least one calling party, and a method for providing an Automatic Customer Callback (ACC) service, comprising:
providing an adjunct processor in electrical communication with said COS;
collecting dialed digits and the calling party telephone number at said at least one end office through a Calling Party Identification (CPI) field in an ISDN User Part (ISUP) Initial Address Message (IAM);
monitoring said communications between said COS and said at least one calling party and said at least one called party to detect said T-busy trigger;
suspending normal call handling upon detection of said T-busy trigger and generating a corresponding first electrical signal for receipt by said SCP requesting further call processing instructions;
analyzing said collected digits to determine if said called party is an ACC service subscriber;
generating a second electrical signal for receipt by said COS indicating whether said ACC service may be activated;
providing to said adjunct processor said collected digits and said calling party telephone number if said ACC service is activated;
monitoring said called party line to detect an idle condition; and
automatically originating a 3-way call from said adjunct processor to said subscriber and said calling party upon detection of said idle condition and disconnecting said adjunct processor from said call upon completion, whereby said subscriber will automatically return the call of said calling party who has activated said ACC service.

5. The method of claim 4, further comprising:
generating a third electrical signal at said COS for receipt by said calling party requesting instructions whether to activate said ACC service;

receiving at said COS a fourth electrical signal generated by said calling party indicating whether said calling party desires to activate said ACC service; and analyzing said fourth electrical signal at said COS and processing said call accordingly.

6. The method of claim 5, wherein said fourth electrical signal is a Dual Tone Multi-Frequency (DTMF) signal.

7. The method of claims 1 or 4, wherein said adjunct processor is an Intelligent Peripheral (IP).

8. For use in an Advanced Intelligent Network (AIN), a system for providing an Automatic Customer Callback (ACC) service for a subscribing called party to call back a calling party, comprising:
at least one end office provided in electrical communication with said calling party for collecting dialed digits and the calling party telephone number through a Calling Party Identification (CPI) field in an ISDN User Part (ISUP) Initial Address Message (IAM) so as to originate a telephone call;
a Service Control Point (SCP) operative to analyze said collected digits and detect said ACC service subscribers;
a Central Office Switch (COS) adapted to recognize an AIN T-busy trigger and thereupon suspend normal call handling and request further call processing instructions from said SCP and said calling party, said COS provided in electrical communication with said calling party, said called party and said SCP via Transaction Capability Application Part (TCAP) signalling protocol; and
an adjunct processor for receiving and storing said collected digits and said calling party telephone number upon activation of said ACC service and coordinating the call back of said calling party by said subscriber, said adjunct processor provided in electrical communication with said COS.

9. The system of claim 8, wherein said adjunct processor is further adapted to monitor said subscriber's telephone line, originate a call thereto upon detection of an idle condition and play a corresponding announcement indicating the need to call back said calling party.

10. The system of claim 8, wherein said COS is further adapted to monitor said subscriber's telephone line and request said adjunct processor to (a) originate a call thereto upon detection of an idle condition, and (b) play a corresponding announcement indicating the need to call back said calling party.

11. The system of claim 8, wherein said COS is further adapted to provide a specialized dial tone to said subscriber indicating the need to call said adjunct processor to obtain information about said calling party who has activated said ACC service.

12. The system of claim 8, wherein said adjunct processor is adapted to automatically initiate a 3-way call to said subscriber and said calling party once an idle condition has been detected at said subscriber's telephone line, said adjunct processor being further adapted to disconnect itself from the call once completed.

13. The system of claim 8, wherein said adjunct processor is an Intelligent Peripheral (IP).

* * * * *